(12) United States Patent
Keightley

(10) Patent No.: US 7,101,124 B2
(45) Date of Patent: Sep. 5, 2006

(54) HOLE SAW ASSEMBLY

(76) Inventor: Kym John Keightley, 5 Vincenzo Street, Fairview Park, South Australia 5126 (AU)

(*) Notice: Subject to any disclaimer, the term of this patent is extended or adjusted under 35 U.S.C. 154(b) by 0 days.

(21) Appl. No.: 10/469,883

(22) PCT Filed: Sep. 20, 2002

(86) PCT No.: PCT/AU02/01296

§ 371 (c)(1),
(2), (4) Date: Apr. 14, 2004

(87) PCT Pub. No.: WO03/024677

PCT Pub. Date: Mar. 27, 2003

(65) Prior Publication Data
US 2004/0179911 A1 Sep. 16, 2004

(30) Foreign Application Priority Data
Sep. 21, 2001 (AU) .................... PR7803

(51) Int. Cl.
B23B 51/04 (2006.01)

(52) U.S. Cl. ............. 408/204; 408/239 R; 403/321; 403/349; 403/350; 403/361; 403/408.1; 83/698.11; 83/698.31

(58) Field of Classification Search ............ 408/204, 408/206, 207, 209, 703; 83/698.11, 698.31, 83/698.41, 698.71, 699.21; 403/321, 349, 403/350, 361, 408.1

See application file for complete search history.

(56) References Cited

U.S. PATENT DOCUMENTS 2,140,192 A * 12/1938 Thatcher ................ 408/206
2,349,400 A * 5/1944 Beckwith ................ 408/206
2,484,150 A * 10/1949 Brown ................... 408/204
2,779,361 A * 1/1957 McKiff ................... 408/204
2,794,469 A * 6/1957 Shortell .................. 408/206
3,267,975 A * 8/1966 Enders ................... 408/200
3,390,596 A * 7/1968 Trevathan ................ 408/68
3,647,310 A * 3/1972 Morse ................. 408/239 R
3,778,179 A * 12/1973 Rivas .................... 408/206
3,880,546 A * 4/1975 Segal .................... 408/204
3,973,862 A  8/1976 Segal
4,148,593 A * 4/1979 Clark .................... 408/204
4,669,928 A * 6/1987 Mediavilla ................ 408/68
4,755,087 A  7/1988 Parent (Continued)

FOREIGN PATENT DOCUMENTS

EP   1 066 902 A2   1/2001

(Continued)

Primary Examiner—Monica Carter
Assistant Examiner—Michael W. Talbot
(74) Attorney, Agent, or Firm—Sand & Sebolt

(57) ABSTRACT

A hole-saw assembly including a hole-saw having at one end a plurality of cutting teeth and at the other end two shafts. The assembly includes a mandrel coaxially aligned with said hole-saw and including a body having two bores therethrough coaxially aligned with said shafts. An annulus located on top of the body is coaxially aligned with said mandrel and hole saw and includes two holes, the annulus rotatable around its longitudinal axis from a first to a second position. In the first position the annulus holes are aligned with the bores and shafts allowing the shafts to be freely insertable and removable and in the second position the holes are misaligned to lock the shafts to the annulus. Such an arrangement allows the hole-saw and the mandrel to be easily and quickly mountable and demountable.

20 Claims, 8 Drawing Sheets

U.S. PATENT DOCUMENTS

| | | | |
|---|---|---|---|
| 4,968,189 A | 11/1990 | Pidgeon | |
| 5,035,550 A * | 7/1991 | Ajimi | 408/204 |
| 5,352,071 A * | 10/1994 | Cochran et al. | 408/204 |
| 5,658,102 A * | 8/1997 | Gale | 408/1 R |
| 5,690,452 A | 11/1997 | Baublits | |
| 6,065,909 A * | 5/2000 | Cook | 408/206 |
| 6,676,343 B1 * | 1/2004 | Burk | 408/204 |
| 2001/0001276 A1 * | 5/2001 | Chao | 408/204 |
| 2002/0037201 A1 * | 3/2002 | Despres | 408/204 |
| 2005/0042048 A1 * | 2/2005 | Keightley | 408/204 |
| 2005/0129475 A1 * | 6/2005 | Ripley et al. | 409/131 |

FOREIGN PATENT DOCUMENTS

| | | |
|---|---|---|
| GB | 1 511 085 | 5/1978 |
| GB | 1 521 839 | 8/1978 |
| GB | 2 013 115 A | 8/1979 |
| GB | 2 257 381 A | 1/1993 |
| JP | 04105811 A * | 4/1992 |
| JP | 08090325 A * | 4/1996 |
| JP | 2001009612 | 1/2001 |
| JP | 2001105401 | 4/2001 |
| WO | WO 2004085104 A1 * | 10/2004 |

* cited by examiner

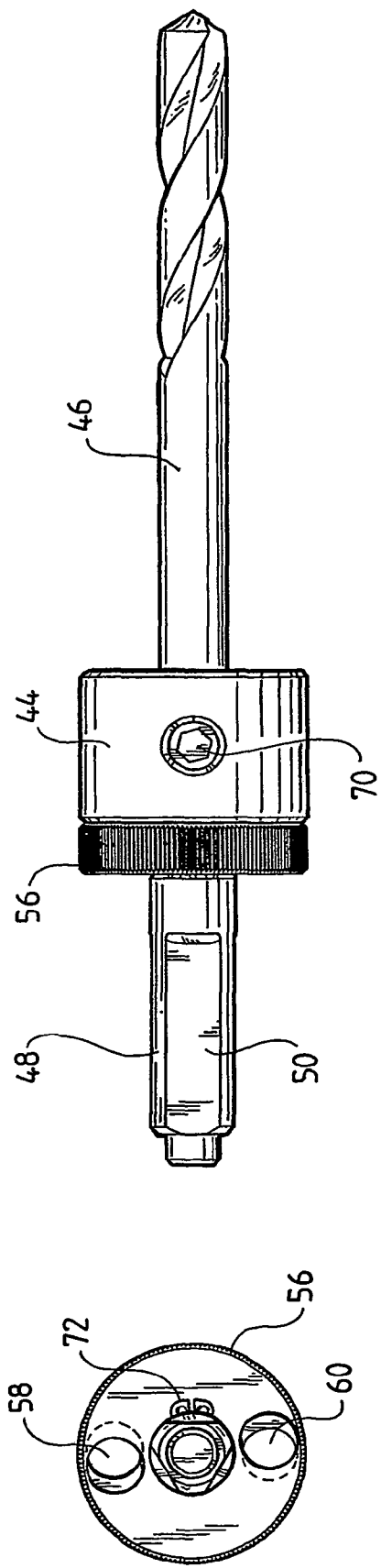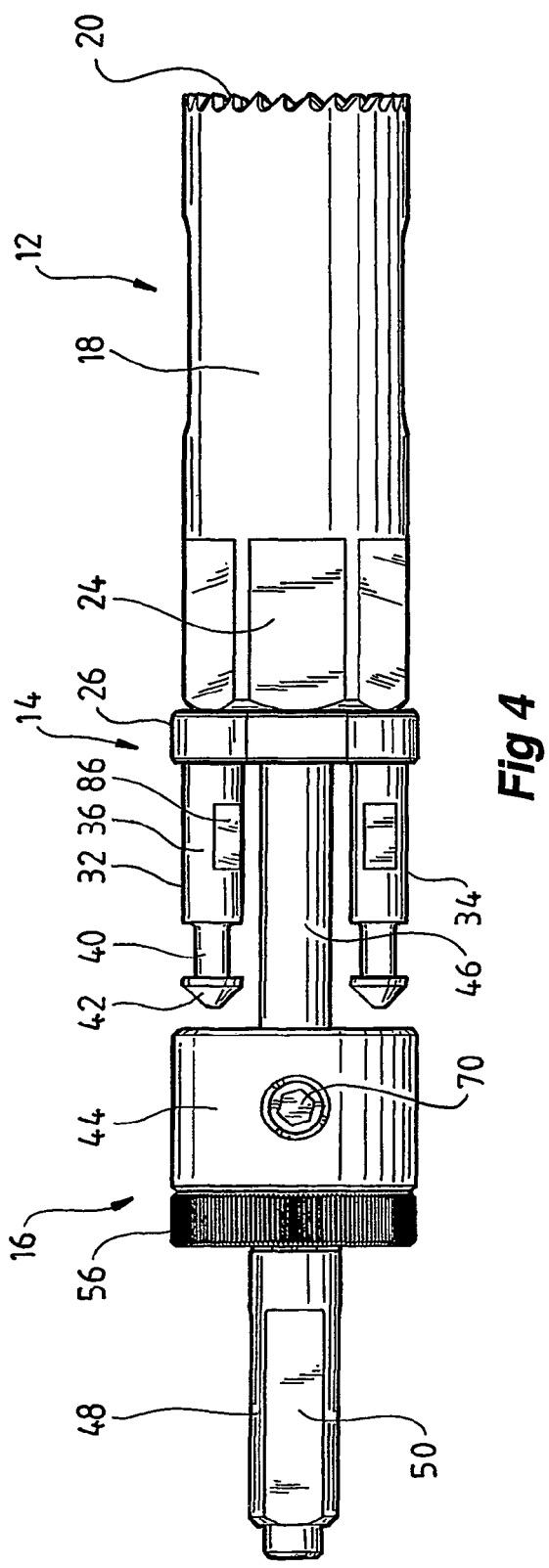

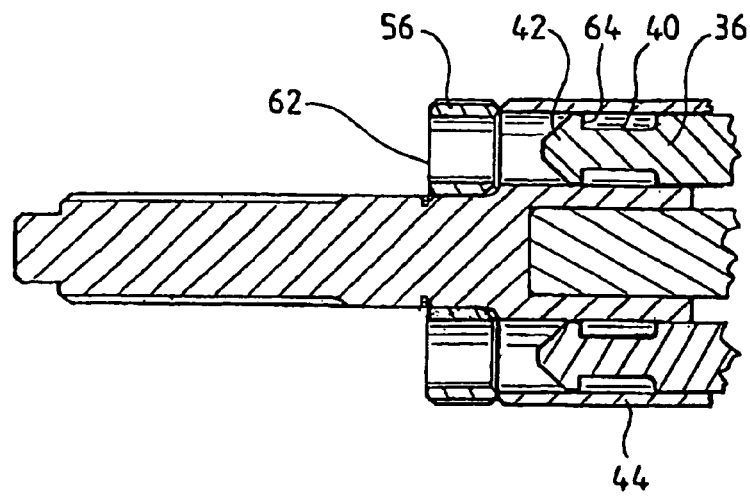
*Fig 5*
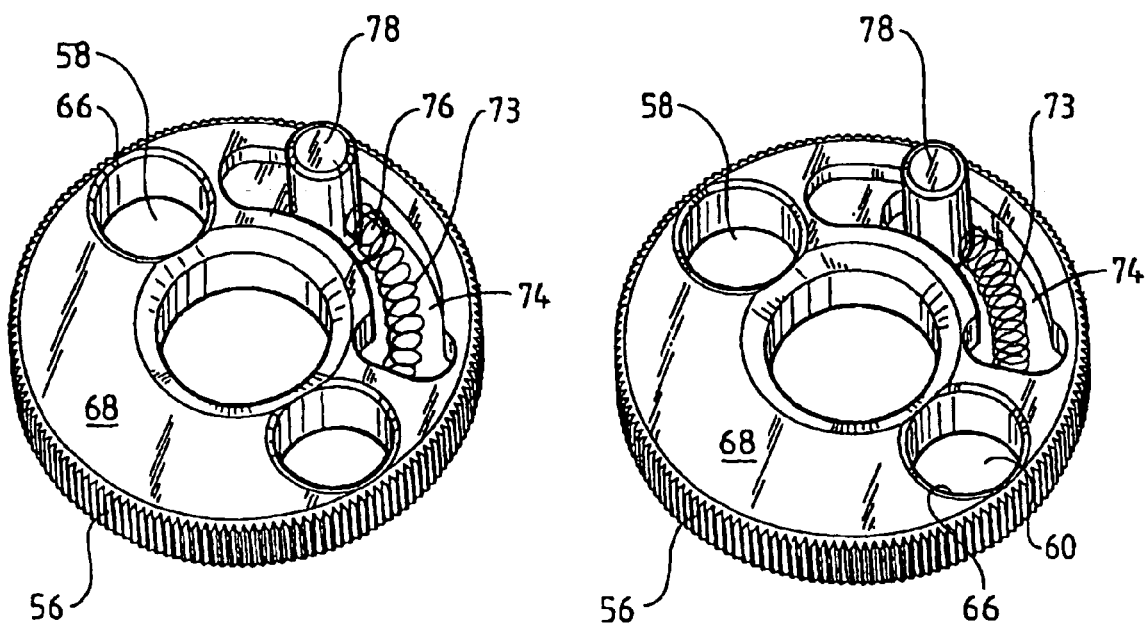
*Fig 6*                *Fig 7*

HOLE SAW ASSEMBLY

BACKGROUND OF THE INVENTION

The present invention relates to an improved hole-saw assembly or arrangement and in particular to a hole-saw with a base that is easily demountable and mountable from a mandrel engageable by a drill.

Hole-saws are a very widely used tool for many applications. Typically a hole-saw includes a flat solid base that is locked by a drill, the base providing support for the hole-saw. Some bases include multiple diameter grooves adapted to accommodate hole-saws of different diameters. Yet others are single sized hole-saws.

A universal problem when using hole-saws is that when a hole has been drilled through a material, the material that has been cut out, commonly referred to as the plug, remains embedded within the hole-saw and needs to be removed. Typically the plug is jammed tightly within the hole-saw and considerable force needs to be used to remove the plug using a sharp instrument, such as a screwdriver. However, some materials, such as plastic, possess material characteristics that make their removal difficult. The ejection of those plugs typically requires the whole hole-saw assembly to be removed from the drill to then try and force the plug out.

In response to this widely recognized problem, various improved hole-saw assemblies have been proposed that try and provide an improved method of removing the plug. Whilst some of these have been found to work well, they are generally mechanically quite complicated. Further, the hole-saw is a dedicated size being limited to a pre-determined diameter and to drill larger size holes requires the use of a whole new hole-saw assembly.

A still further limitation of existing hole-saw assemblies is that they can at any one time only accommodate one hole-saw and do not enable the simultaneous use of two different sized hole-saws.

It is an object of the present invention to propose a hole-saw that overcomes at least some of the abovementioned problems or provides the public with a useful alternative.

It is a further object of the present invention to provide a hole-saw assembly where the hole-saw can be easily removed from the mandrel.

It is still a further object of the present invention to provide for a hole-saw assembly wherein different sized hole-saws may be easily mounted for use with a drill.

It is yet a further object of the present invention to provide for a hole-saw assembly wherein at least two different sized hole-saws may be used simultaneously in drilling a larger hole.

SUMMARY OF THE INVENTION

Therefore in one form of the invention there is proposed a hole-saw assembly including:
a hole-saw having at one end a plurality of cutting teeth and at the other end two shafts;
a mandrel coaxially aligned with said hole-saw and including a body having two bores therethrough coaxially aligned with said shafts;
an annulus coaxially aligned with said mandrel and hole saw and including two holes, said annulus rotatable around its longitudinal axis from a first to a second position, wherein in said first position said annulus holes are aligned with said bores and said shafts allowing said shafts to be freely insertable and removable and in said second position said holes being misaligned thereby locking said shafts to said annulus.

Preferably said annulus is biased to said second position.

Preferably said assembly includes a base from which therein extend the two shafts said base including a mounting means for mounting of a hole-saw thereon.

Preferably said hole-saw includes a threaded inner bore adapted to engage a threader outer projection extending from said base.

In a preferred embodiment said shafts include a flute adjacent said outer end and a cap on said outer end, the cap having an inner surface adapted to engage the annulus when said annulus is in said second position to thereby lock the shafts from longitudinal movement from the annulus.

Preferably said assembly includes a drill-bit mounted on said mandrel, said drill-bit extending through and beyond said hole-saw.

In a further from of the invention there is proposed a hole-saw assembly including:
a hole-saw having a longitudinal body with a plurality of cutting teeth at one end and a threaded inner bore at the other end;
a base including a disk co-axially aligned with said hole-saw body and including a threaded projection extending longitudinally therefrom, said projection adapted to be engaged by said hole-saw threaded bore, said disk including a pair of shafts extending in a longitudinal direction away from said hole-saw, each said shaft including a column adjacent said base a flute adjacent said shaft outer end and a chamfered cap, the diameter of said cap equal to the diameter of said column;
a mandrel co-axially aligned with said base and hole-saw and including a body having a drill bit extending therefrom, said drill bit passing through central apertures in the base and said hole-saw, said mandrel further having two bores therethrough co-axially aligned with said base shafts;
a annulus resting on top of said base and being rotatable between a first and a second position, said annulus further including two holes wherein said holes in the first position are aligned with the bores in said mandrel and the shafts of said base, and in said second position are misaligned, the thickness of the mandrel body and annulus being such that the flute is engaged by said annulus with the cap extending beyond the annulus so that when in said second position the annulus locks said shafts in a relative longitudinal position.

In a preferred embodiment said assembly includes an inner and an outer hole-saw mounted on said mandrel, said inner hole-saw extending beyond said outer hole-saw.

In a still further form of the invention there is proposed a hole-saw arrangement for use in a drilling machine including a hole-saw and a mandrel assembly characterised in that there is included a biased member which when in a first position, is adapted to engage with and lockingly retain said hole-saw when it is mounted onto said mandrel and upon movement to a second position, said biased member is adapted to unlock and release said hole-saw allowing said mandrel and hole-saw to be separated.

In preference the mandrel assembly includes a body that rotationally supports the biased member at one end and a hole-saw boss at the other.

In preference the hole-saw boss includes at one end a thread for engaging with a thread in the hole-saw with the opposite end having at least two extending pins which are inserted into at least two holes in the body so that the hole-saw boss and body are rotationally engaged.

In preference the biased member is a spring-loaded rotatable ring that interacts with a taper on the extending pins on insertion into the main body to move away from a first position to a second position. In this second position the rotatable ring engages shoulders on the extendable pin to lock the hole-saw boss and main body together.

In preference upon rotation of the rotatable ring back toward the first position, the shoulders are disengaged and the hole saw boss is unlocked and can be slidably removed.

In preference the range of movement of the rotatable ring is limited by interaction of an abutment and a pin contained in the rotatable ring and the main body.

An advantage of such an arrangement is that a hole saw may be rapidly removed and re-attached to a mandrel without the use of threads and without the use of a tool. This is particularly advantageous when the hole saw becomes clogged and needs to be cleared or when the hole saw is interchanged with a hole saw of a different size.

Still a further advantage is that by utilising a boss, commonly available hole-saws may be used with the mandrel.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings:

FIG. 2 is a side view of the hole-saw assembly base mandrel embodying the present invention;

FIG. 3 is a top view of the mandrel of FIG. 2;

FIG. 4 is a side view of the hole-saw assembly as the hole-saw and base is mounted on the mandrel;

FIG. 5 is a partial cross-sectional view illustrating the engagement of the hole-saw base with the mandrel;

FIG. 6 is a detailed partial underside perspective view of the locking mechanism of the mandrel when in a locked or biased position;

FIG. 7 is the mechanism of FIG. 6 when in an unlocked position;

DESCRIPTION OF THE PREFERRED EMBODIMENTS

Figure 1:
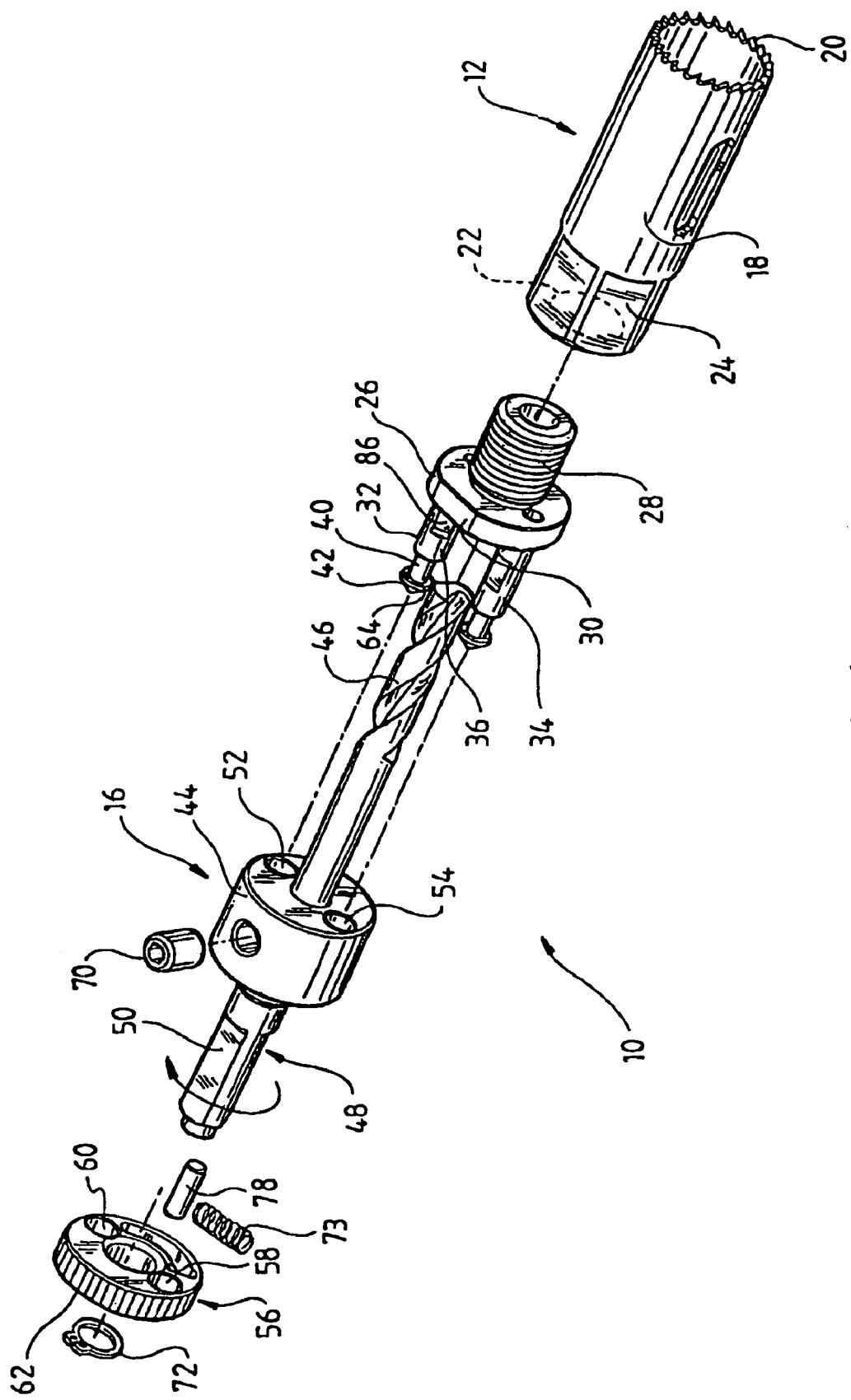
FIG. 1 is an exploded isometric view of a hole-saw assembly embodying the present invention.

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

Referring to FIGS. 1 to 5 there is shown a hole-saw assembly 10 including a hole-saw 12, base 14, and mandrel 16.

The hole-saw 12 includes a cylindrical body 18 having cutting teeth 20 at one end thereof. At the opposite end the hole-saw 12 includes a threaded bore 22 (with inner threads), the outer surface of the hole-saw body 18 adjacent the bore 22 including circumferentially disposed shoulders 24 to enable a tool (not shown) such as a wrench to engage the hole-saw 12 for rotational movement thereof.

The base 14 includes disk 26. Extending co-axially from the disk 26 is a threaded projection 28 (with outer threads), of a size and shape to be engaged by the bore 22 thus enabling hole-saw 12 to be tightly screwed onto the base. The disk 26 includes shoulders 30 for engagement by a tool. Those skilled in the art will appreciate that the use of two tools, one on the hole-saw 12 and one on the base 14, the hole-saw may also be removed from the base.

Extending adjacent the edge of the disk 26 and in the opposite direction to the projection 28 are two identical shafts 32 and 34. Since the shafts perform the same function and operate in exactly the same way, only one will be described in the rest of the description. It is however to be understood that the description applies equally well to both.

Shaft 32 includes a column 36 extending from the disk and attached to the disk using well-known techniques such as threads or press fitting. Adjacent the outer end of the column 36 is a flute 40, the column then having a chamfered cap 42 fixed on its outer end whose outer diameter is equal to the diameter of the column 36.

The mandrel 16 includes a longitudinal body 44 extending co-axially from and rotationally affixed to which is a drill bit 46. Extending in the opposite direction to the drill bit 46 is an arbour 48 having shoulders 50 and is insertable into a drill (not shown) as is well known in the art. The body 44 includes two holes 52 and 54 whose location and size is such to allow for the insertion and passage through of shafts 32 and 34 therein, shaft 32 insertable into hole 52 and shaft 34 insertable into hole 54. Typically, the holes 52 and 54 are of a diameter to effectively enable the shaft to be mounted to the body 44.

The length of the body 44 is the same length as that of the shaft column 36 from the disk 26 to the flute 40 so that when the shaft 32 is inserted into body 44 the flute and the cap protrude beyond the body 44.

Located on top of the body 44 is a co-axial annulus or ring 56, rotatably movable between a first and a second position. The annulus 56 includes two correspondingly shaped and sized apertures 58 and 60 that are aligned with the holes 52 and 54 when the annulus is in the first position and are misaligned when the annulus is in the second position.

Those skilled in the art will appreciate that the shaft flute 40 and cap 42 then extend into the annulus when it is aligned with the body. The thickness of the annulus 56 is equal to the width of the flute 40 so that when fully inserted into the mandrel only the cap 42 extends beyond the surface plane of the annulus 56.

When the annulus is in the second position with the shaft 32 fully inserted into the mandrel, the upper surface of the annulus 62 engages the lip 64 of the cap 42, effectively preventing the shaft 32 from being withdrawn from the mandrel 16. This effectively therefore locks the base 14 and hence the hole-saw 12 to the mandrel 16 enabling the hole-saw to be used to drill a hole.

The annulus is biased to the second position, that is, the locked position and a rotational force has to be applied to rotate it to the first position to enable for the withdrawal of the shafts 32 and 34. The rotation from the biased second position to the first position is generally in the same direction as the rotation of the drill.

The skilled addressee will now appreciate that the present hole-saw assembly enables for the very quick mounting and unmounting of a hole-saw and base to a mandrel that is already mounted in a drill. Since the diameter of the hole-saw is independent of the size of the base and hence the mandrel, one may have a number of hole-saws that they simply mount and unmount to and from the mandrel by rotating the annulus between the first and second positions.

However, to further assist in quick mounting of the hole-saw base 14 to the mandrel 16, the circular edges 66 of holes 58 and 60 on the underside 68 of the annulus 56, that is the side that faces the base 44, may be tapered or chamfered. As the shafts 32 and 34 are inserted into the mandrel through holes 52 and 54 and apertures 58 and 60, the cap forces the annulus to rotate to the first position. As the cap passes beyond the upper surface of the annulus, the biasing means causes it to snap back into its biased position thereby locking the base and hence the hole-saw to the mandrel. This provides the tool operator with an automatic "snap-fit" arrangement.

Body 44 is typically clamped onto the drill bit 46 using a grub screw 70. However, it may equally well be attached, as would be known by the skilled addressee, using other common techniques.

The annulus is secured in its position using a circlip 72. To prevent rotation of the circlip that may effectively block one of the apertures 58 or 60, a cusp (not shown) or projection may be used to lock the circlip relative to the annulus.

Referring now to FIGS. 6 and 7 there is shown in detail the annulus 56 and specifically the biasing arrangement. The annulus includes a groove 74 within which is located the biasing means, typically a spring 73. At one end of the groove is located a channel 76 within which slidably moves a pin 78. The pin engages a correspondingly shaped bore (not shown) in the body 44 whereby it is locked into place when the annulus is placed on top of the body. The length of the channel 76 within which the pin can effectively move, the two positions illustrated in FIGS. 6 and 7, then limits rotation of the annulus as shown in FIG. 3.

Figure 8:
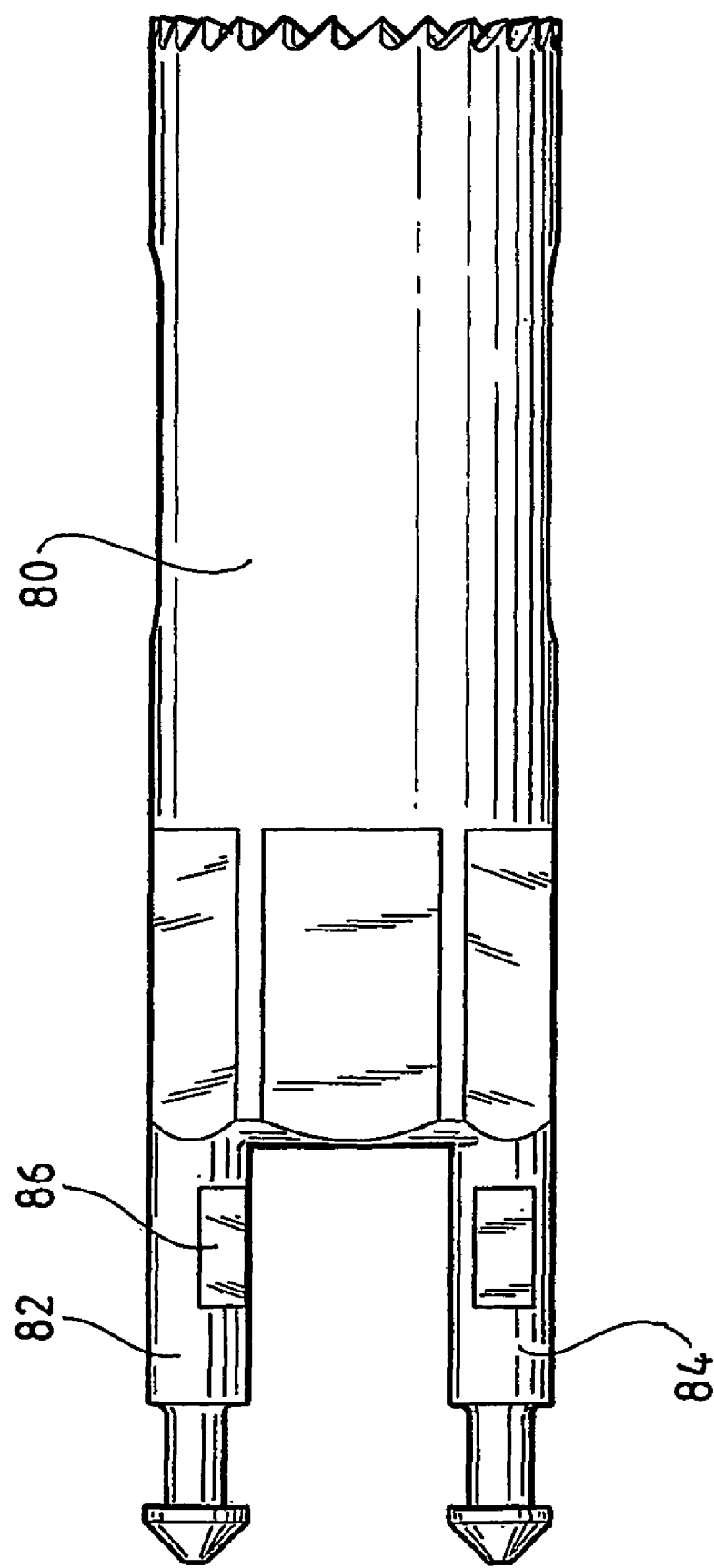
FIG. 8 is a perspective view of an alternate hole-saw and base embodying the present invention when formed in one piece.

In a preferred embodiment, the hole-saw may be manufactured integrally with the shafts that engage the mandrel. This embodiment is illustrated in FIG. 8 wherein one can see that the hole-saw 80 has integral shafts 82 and 84 whose shape and function is the same as discussed earlier. Such a hole-saw may be for example be manufactured using machining or metal casting processes. An advantage of this is in the reduction of parts for manufacture resulting in reduced costs.

To assist in handling the shafts they may include shoulders 86 that can be engaged by a tool, the shoulder also a feature of the earlier embodiment.

Figure 9:
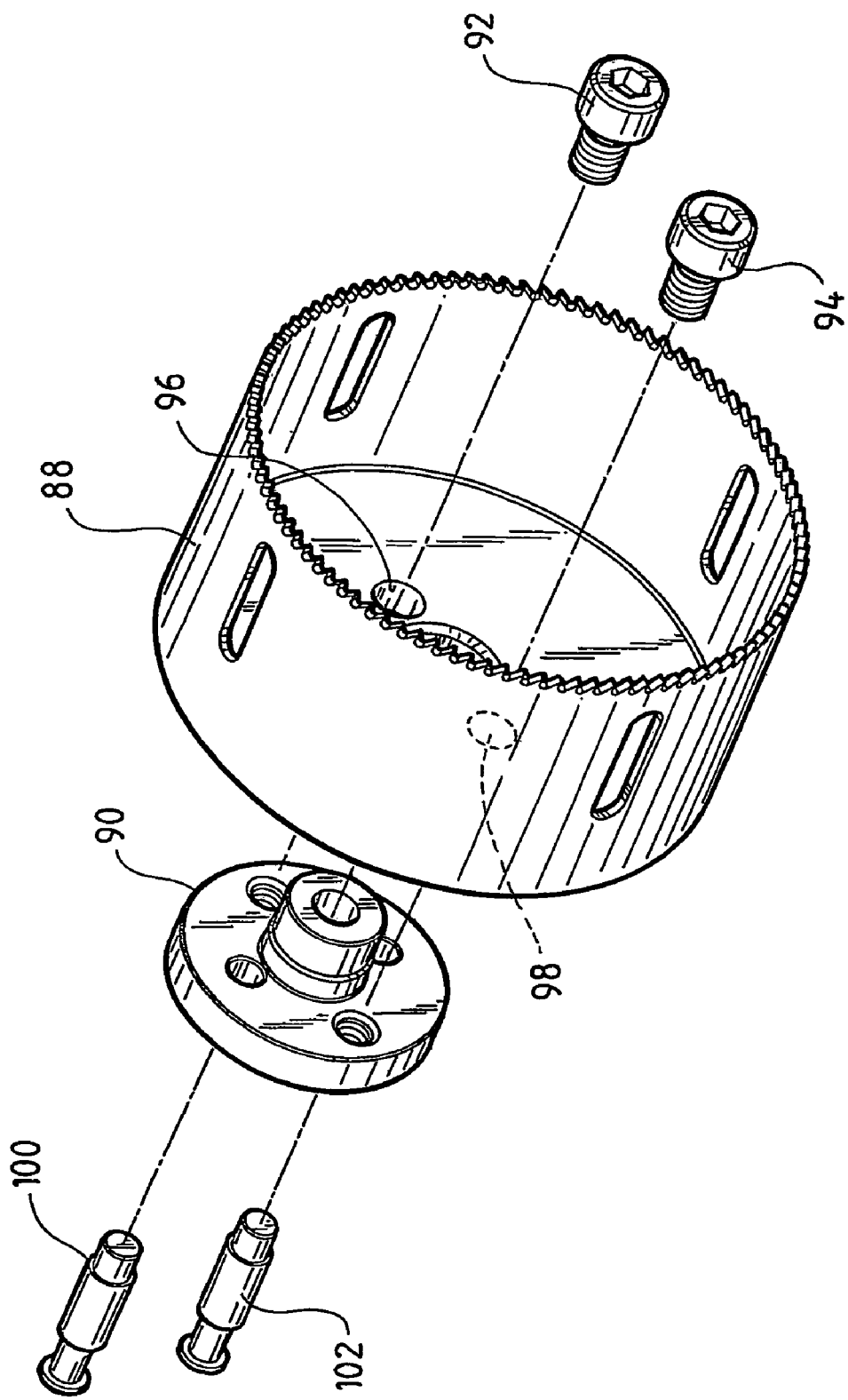
FIG. 9 is a perspective view of a large diameter hole-saw and base embodying the present invention.

In the case where the hole-saw is of a significant diameter, as illustrated in FIG. 9, the hole-saw 88 may be attached to the base 90 not by using threaded engagement members but rather by the use of screws 92 and 94 that pass through apertures 96 and 98 in the bottom of the hole-saw and engage the ends of shafts 100 and 102 respectively thereby locking the hole-saw to the base 90.

Figure 10:
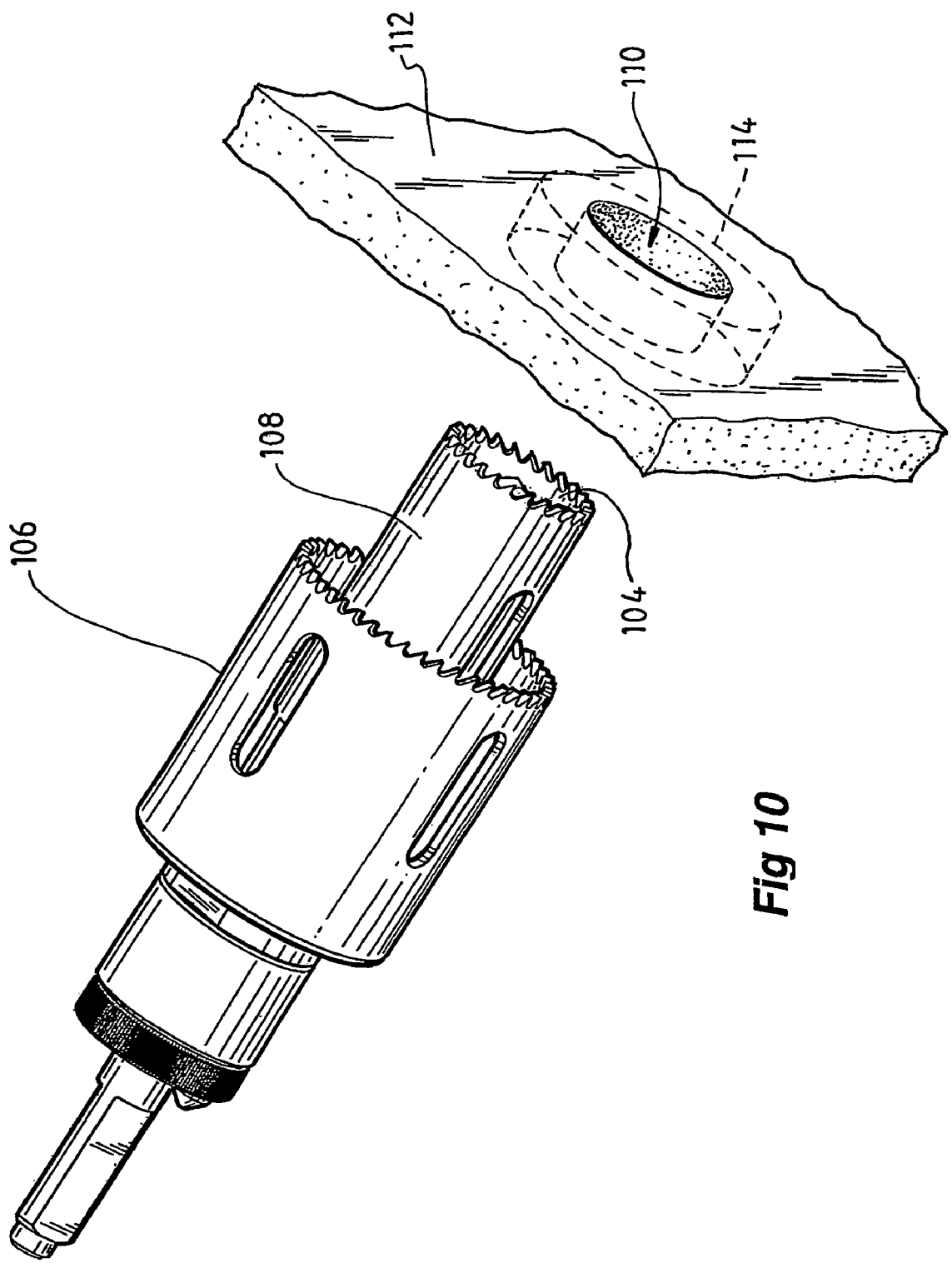
FIG. 10 is a perspective view of a hole-saw assembly embodying the present invention and having two hole-saws, one within the other for guiding the larger hole-saw.

In an alternate embodiment, the projection 28 of the base 14 illustrated in FIGS. 1–5 may be made significantly longer than is currently known. This would then enable two hole-saws to be mounted on the one base. This is a particularly useful feature where the operator may wish to drill a bigger hole over an existing hole wherein the size of the smaller hole-saw is chosen to be the size of the already existing hole. The smaller hole-saw is then used as an effective guide center to be able to cut out the bigger hole in a symmetrical arrangement. As illustrated in FIG. 10 the hole-saw assembly according to this preferred embodiment includes a smaller hole-saw 104 that extends beyond a larger hole-saw 106 in the longitudinal direction. The diameter of the smaller hole-saw 104 is chosen so that its outside surface 108 engages the inner surface of hole 110 in wall 112. The smaller hole-saw 104 ensures that when hole-saw 106 engages the wall, it does not gyrate ensuring that the larger hole 114 to be cut-out in the wall is co-axial with the smaller hole 110.

Figure 11:
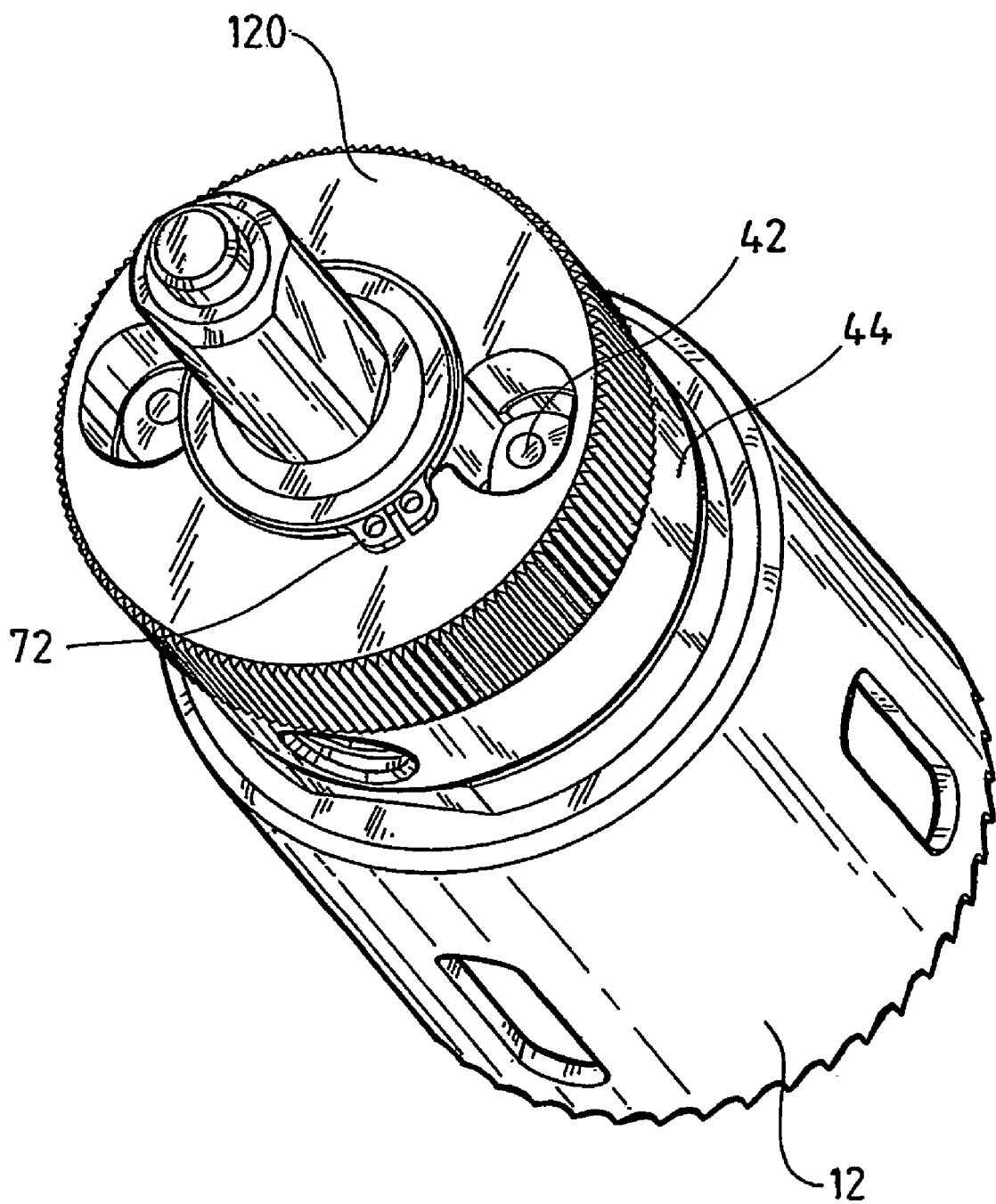
FIG. 11 is a perspective view of a hole-saw assembly according to yet a further embodiment of the invention and where the shafts of the hole-saw base are housed within the mandrel and do not protrude through its upper surface.
Figure 12:
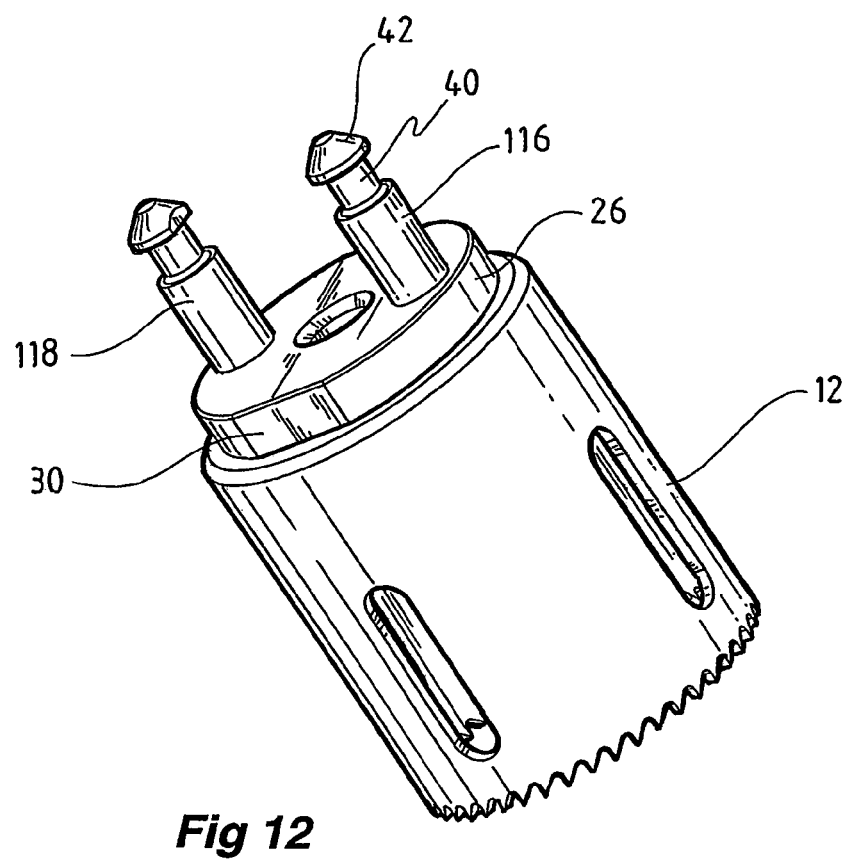
FIG. 12 is a perspective view of the hole-saw and base of FIG. 11 illustrating the shorter shafts.
Figure 13:
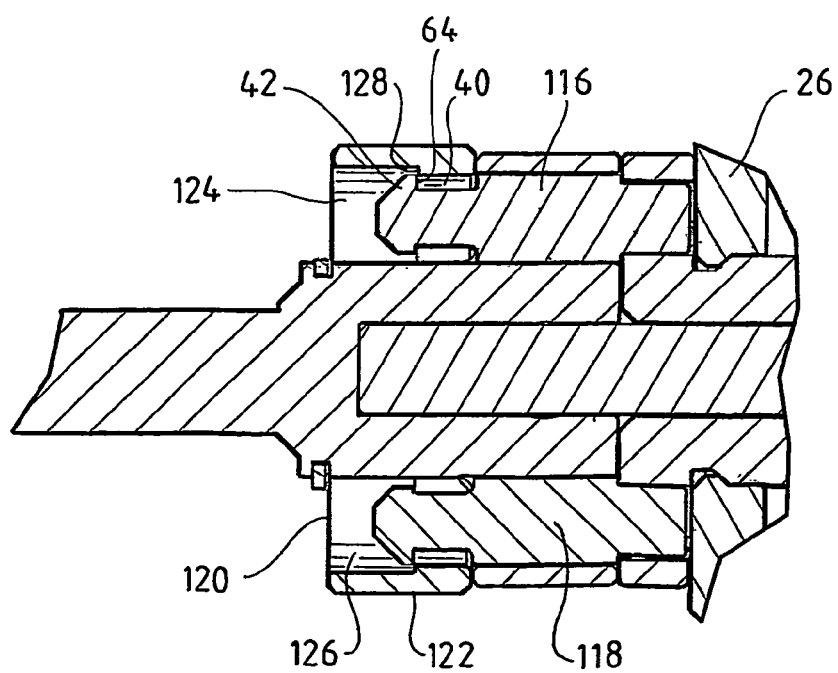
FIG. 13 is a cross-sectional view of the hole-saw assembly of FIG. 11 when the hole-saw and base are mounted to the mandrel.

Illustrated in FIGS. 11 to 13 is a hole-saw assembly according to a further preferred embodiment of the present invention. In this embodiment the hole-saw 12 and base 26 are of the same type as described above. However the total length of the shafts 116 and 118 are somewhat shorter, the shafts still having flutes 40 and caps 42. The shorter shafts, assuming that the base and the annulus are the same size, results in the shafts not protruding beyond the annulus as was the case in the earlier embodiment. This is clearly illustrated in FIGS. 11 and 13 where one can see that the shafts 116 and 118 do not protrude beyond the upper surface 120 of the annulus 122.

Since the shafts 116 and 118 no longer protrude beyond the annulus 56, the previously described locking technique of the mandrel to the shafts is no longer available. For that reason, holes 124 and 126 adjacent the upper surface 120 of the annulus 56 are partially enlarged to provide an inner shoulder 128 that can be engaged by the lip 64 of the cap 42. Accordingly, the annulus holes 124 and 126 are of a circular cross-section only for the length of the flute 40 from the annulus bottom surface 68, and are then enlarged to accommodate for the rotational movement of the annulus 56 to lock and unlock the shafts 116 and 118 to the mandrel.

This embodiment overcomes the need for a dimple or the like to prevent the clip 72 from any rotational movement. It also provides for a more visually pleasing appearance and reduces the risk of the caps catching.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In any claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. A rotational tool support assembly including:
   a boss adapted at one end to support a tool and at the other end two shafts;
   a driving means coaxially aligned with said boss and including a body having two bores therethrough coaxially aligned with said shafts;
   a locking ring coaxially aligned with said driving means and boss and including two holes, said locking ring rotatable around its longitudinal axis from a first to a second position, wherein in said first position said locking ring holes are aligned with said bores and said shafts allowing said shafts to be freely insertable and removable and in said second position said holes being misaligned thereby locking said shafts to said locking ring.

2. A hole-saw assembly including:
   a hole-saw having at one end a plurality of cutting teeth and at the other end two shafts;
   a mandrel coaxially aligned with said hole-saw and including a body having two bores therethrough coaxially aligned with said shafts;
   a locking member forming part of said mandrel and including two holes, said locking member moveable from a first to a second position, wherein in said first position said locking member holes are aligned with said bores and said shafts allowing said shafts to be freely insertable and removable and in said second position said holes being misaligned thereby locking said shafts to said locking member.

3. A hole-saw assembly as in claim 2 wherein said locking member is biased to said second position.

4. A hole-saw assembly as in claim 2 wherein said assembly includes a base from which therein extend the two shafts, said base including a mounting means for mounting of a hole-saw thereon.

5. A hole-saw assembly as in claim 4 wherein said hole-saw includes a threaded inner bore adapted to engage a threaded outer projection extending from said base.

6. A hole-saw assembly as in claim 2 wherein said shafts include a flute adjacent said outer end and a cap on said outer end, the cap having an inner surface adapted to engage the locking member when said locking member is in said second position to thereby lock the shafts from longitudinal movement from the locking member.

7. A hole-saw assembly as in claim 2 including a drill-bit mounted on said mandrel, said drill-bit extending through and beyond said hole-saw.

8. A hole-saw assembly as in claim 2 where said locking member is an annulus coaxially aligned with said mandrel.

9. A hole-saw assembly as in claim 8 wherein said annulus is rotatable around its longitudinal axis from said first to said second position.

10. A hole-saw assembly including:
    a hole-saw having a longitudinal body with a plurality of cutting teeth at one end and a threaded inner bore at the other end;
    a base including a disk co-axially aligned with said hole-saw body and including a threaded projection extending longitudinally therefrom, said projection adapted to be engaged by said hole-saw threaded bore, said disk including a pair of shafts extending in a longitudinal direction away from said hole-saw, each said shaft including a column adjacent said base, a flute adjacent said shaft outer end and a chamfered cap, the diameter of said cap equal to the diameter of said column;
    a mandrel co-axially aligned with said base and hole-saw and including a body having a drill bit extending therefrom, said drill bit passing through central apertures in the base and said hole-saw, said mandrel further having two bores therethrough co-axially aligned with said base shafts;
    an annulus resting on top of said base and being rotatable between a first and second position, said annulus further including two holes wherein said holes in the first position are aligned with the bores in said mandrel and the shafts of said base, and in said second position are misaligned, the thickness of the mandrel body and annulus being such that the flute is engaged by said annulus with the cap extending beyond the annulus so that when in said second position the annulus locks said shafts in a relative longitudinal position.

11. A hole-saw assembly as in claim 10, said assembly including an inner and an outer hole-saw mounted on said mandrel, said inner hole-saw extending beyond said outer hole-saw.

12. A rotational tool support assembly including:
    a boss adapted at one end to support a tool and at the other end at least one shaft;
    a driving means coaxially aligned with said boss and including a body having at least one bore therethrough coaxially aligned with said at least one shaft;
    a locking ring coaxially aligned with said driving means and boss and including at least one hole, said locking ring rotatable around its longitudinal axis from a first to a second position, wherein in said first position said at least one hole of said locking ring is aligned with said at least one bore and said at least one shaft, thereby allowing said at least one shaft to be freely insertable and removable; and in said second position said at least one hole being misaligned, thereby locking said at least one shaft to said locking ring.

13. A hole-saw assembly including:
    a hole-saw having at one end a plurality of cutting teeth and at the other end at least one shaft;
    a mandrel coaxially aligned with said hole-saw and including a body having at least one bore therethrough coaxially aligned with said at least one shaft;
    a locking member forming part of said mandrel and including at least one hole, said locking member moveable from a first to a second position, wherein in said first position said at least one hole of said locking member is aligned with said at least one bore and said at least one shaft, allowing said at least one shaft to be freely insertable and removable; and in said second position said at least one hole being misaligned thereby locking said at least one shaft to said locking member.

14. A hole-saw assembly as in claim 13 wherein said locking member is biased to said second position.

15. A hole-saw assembly as in claim 13 wherein said assembly includes a base from which therein extend the at least one shaft, said base including a mounting means for mounting of a hole-saw thereon.

16. A hole-saw assembly as in claim 15 wherein said hole-saw includes a threaded inner bore adapted to engage a threaded outer projection extending from said base.

17. A hole-saw assembly as in claim 13, wherein said at least one shaft includes a flute adjacent said outer end and a cap on said outer end, the cap having an inner surface adapted to engage the locking member when said locking member is in said second position to thereby lock the at least one shaft from longitudinal movement from the locking member.

18. A hole-saw assembly as in claim 13, including a drill-bit mounted on said mandrel, said drill-bit extending through and beyond said hole-saw.

19. A hole-saw assembly including:
 a hole-saw having a longitudinal body with a plurality of cutting teeth at one end and a threaded inner bore at the other end;
 a base including a disk co-axially aligned with said hole-saw body and including a threaded projection extending longitudinally therefrom, said projection adapted to be engaged by said hole-saw threaded bore, said disk including at least one shaft extending in a longitudinal direction away from said hole-saw, said at least one shaft including a column adjacent said base, a flute adjacent said shaft outer end and a chamfered cap, the diameter of said cap equal to the diameter of said column;
 a mandrel co-axially aligned with said base and hole-saw and including a body having a drill bit extending therefrom, said drill bit passing through a central aperture in the base and said hole-saw, said mandrel further having at least one bore therethrough co-axially aligned with said at least one shaft of said base;
 an annulus resting on top of said base and being rotatable between a first and second position, said annulus further including at least one hole, wherein said at least one hole in the first position is aligned with the at least one bore in said mandrel and the at least one shaft of said base, and in said second position is misaligned, the thickness of the mandrel body and annulus being such that the flute is engaged by said annulus with the cap extending beyond the annulus so that when in said second position the annulus locks said at least one shaft in a relative longitudinal position.

20. A hole-saw assembly as in claim 19, said assembly including an inner and an outer hole-saw mounted on said mandrel, said inner hole-saw extending beyond said outer hole-saw.

* * * * *